July 22, 1958  E. T. ARMSTRONG  2,844,230
PERMEABLE BRAKE
Filed Aug. 4, 1954

*INVENTOR.*
EDWARD T. ARMSTRONG
BY
*ATTORNEY*

# United States Patent Office 2,844,230
Patented July 22, 1958

2,844,230
PERMEABLE BRAKE

Edward T. Armstrong, Passaic, N. J., assignor to The Goodyear Tire & Rubber Company, Akron, Ohio, a corporation of Ohio Application August 4, 1954, Serial No. 447,823

3 Claims. (Cl. 188—264)

This invention relates to apparatus for rapidly dissipating kinetic energy in the form of heat in the acceleration or deceleration of moving parts and is especially useful in the construction of brakes and clutches.

It is especially useful in the construction of brakes for the wheels of aircraft where severe braking conditions are prevalent, although the invention is also useful in the construction of brakes for land vehicles and in industrial brakes and clutches for accelerating or decelerating machine members.

In conventional brakes and clutches, one of the basic problems is the necessity of rapidly absorbing or dissipating the heat evolved in the conversion of the kinetic energy. In the field of transportation, the use of more powerful and efficient motive power, with resulting higher speeds, is such that the temperatures produced in braking frequently exceed the permissible operating temperature of material used for construction of the brakes. As a result, there is danger of failure of the brake, in the worst case, or of fading of the braking action, or of inducing excessive wear.

This problem is particularly severe with control of aircraft. It has been found that sudden braking necessary in landing or in a "rejected" take-off will heat the brake material to such an extent that a cooling period of as much as two hours may be required before the brakes can again be used. The greater weight of aircraft required for extended operations, and the increase in speed through the use of jet engines, further aggravates this problem. Also, when using jet engines the braking effect achieved by reversal of propellers is lost.

The problem of heat dissipation is also encountered in any apparatus in which provision must be made for intermittent transmittal of motive power without a corresponding speed reduction at the source. It will be obvious that any means for dissipating heat from a brake may be equally adapted for use in a clutch or similar mechanism.

It has now been found that, by means of the invention to be hereinafter described, a much greater amount of the heat produced by friction in a brake or clutch can be absorbed by an expendible coolant. Also, the temperature of such a brake can be maintained below the maximum permissible operating temperature of the material of which it is constructed.

Accordingly, one of the objects of this invention is to provide a method and apparatus for absorbing and/or dissipating heat.

A further object is to provide an apparatus suitable for use as a brake or clutch having a very large heat-sink capacity.

Another object is to provide a brake suitable for use in machinery wherein sudden acceleration or deceleration is desired.

Other objects are to reduce the size and weight of brakes and clutches, to provide a transpiration cooled brake or clutch member in which the end products of the cooling medium are gases and thereby to reduce throwing or spilling of end products, to provide a greater co-efficient of friction by presence of gaseous end products at the braking face, and to provide for cooling of the brake member by absorption of heat by the coolant due to expansion of a liquid coolant to a gas during its passage through the brake member.

These and other objects and advantageous features will be found from the following detailed description and drawings, wherein.

In general, this invention as adapted to a brake comprises constructing at least one of the co-acting brake members from some permeable material. This invention further comprises permeating such brake member with a suitable material which may be heated and sometimes may be dissociated by the braking temperature, thereby providing a large heat-sink capacity for absorption of the friction energy.

Figure 1:
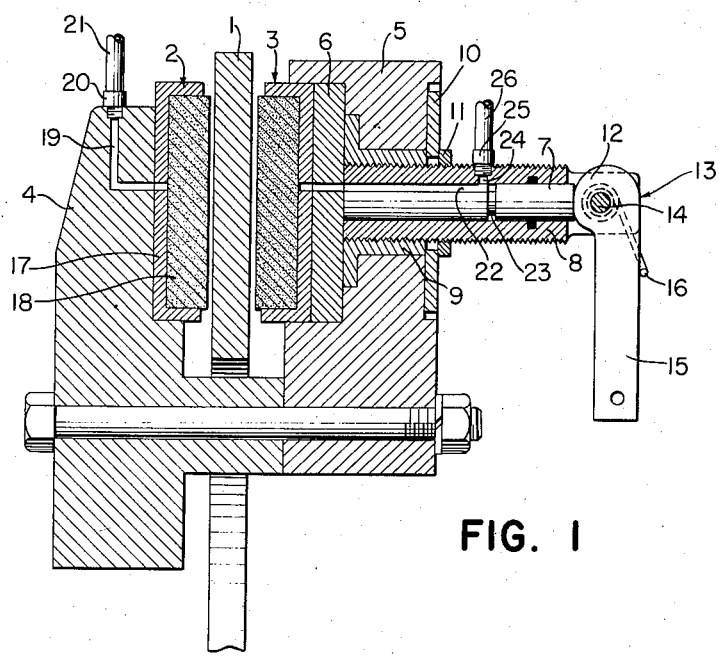
Fig. 1 is a cross section of a single-disc mechanical brake embodying the principles of the invention.

Referring to the drawings, which show one embodiment of the invention, in Fig. 1 is shown a portion of a rotating annular brake disc 1. One or more pairs of brake shoes or bodies 2 and 3 are mounted so as to contact opposing sides of brake disc 1 in frictional engagement therewith when braking pressure is applied. Brake shoe 2 is supported by housing 4, and brake shoe 3 is supported by housing 5.

Braking pressure may be applied to brake shoe 3 in any known manner, as for example in one simplified mechanical form, by means of pressure plate 6, which is moved by brake pushrod 7. Pushrod 7 is contained in pushrod bushing 8, adjusting bushing 9, adjusting washer 10 and adjusting locknut 11. The brake pushrod 7 is moved against pressure plate 6 by the action of cam 12, which is a part of brake lever assembly 13. Brake lever assembly 13 is mounted to revolve about pin 14 as arm 15 is moved by some external means, not shown. Return spring 16 relieves the brake pressure when the external force on arm 15 is released.

The brake shoe 2 of this invention in the illustrated embodiment comprises a supporting shell 17 and a permeable body 18. The body 18 is constructed of a permeable material and is adapted to contact brake disc 1 by the mechanism already described. A coolant medium is introduced into brake shoes 2 and 3 and permeates the body 18. The coolant medium is then dissipated to the atmosphere at the interface of the body and the disc.

The coolant medium may be introduced into shoe 2 through conduit 19, coupling 20 and tubing 21 from a supply thereof (not shown). The coolant is introduced into shoe 3 by means of a conduit through pressure plate 6 and a keyway 22 in brake pushrod 7. The keyway 22 terminates in an annular groove 23, which is aligned with an aperture 24 in pushrod bushing 8 when brake pressure is applied. The coolant medium is supplied through a coupling 25 and tubing 26 from a supply thereof (not shown).

It may be advisable to construct a portion of the brake disc 1 of a permeable material, and to introduce the coolant into the brake disc itself.

It is important for the operation of this brake that a suitable coolant medium be selected to extract the maximum amount of heat during operation of the brake. While a number of flowable materials may be employed as coolants, either readily gasifiable liquids or gaseous coolants may be more desirable than other fluids in that less problem arises as to disposal thereof and throwing of liquid end products is minimized. It may also be desirable that a coolant be chosen that is convenient to store and use and which may also be non-corrosive, non-toxic, or non-irritant. A number of gases may be employed which are readily stored in liquified or compressed condition, such as carbon dioxide or air, but the heat absorption properties of such gases are quite different, and it must be recognized that some are superior to others. Further, it has been found that a refrigerant such as ammonia has an extremely great capacity for heat absorption in comparison with other possible coolants. The following table shows the heat dissipation quantities of some coolant materials available for and capable of use:

*Table I($^1$)*

| Material | Air | Carbon Dioxide | Water | Ammonia |
| --- | --- | --- | --- | --- |
| B. t. u./lb | 300 | 564 | 1,650 | 2,700 |

$^1$ These values are based upon enthalpy changes from 0° F. to 1200° F. under thermal equilibrium. In the case of ammonia equilibrium dissociation has been assumed.

It can also be seen from the above table that the amount of ammonia required for dissipation of a given amount of heat is much less than that required for other materials listed. For example, it has been determined that the braking of a 100,000 pound aircraft, having a landing speed of 100 feet per second would evolve 20,000 B. t. u. of heat. The dissipation of this amount of heat by means of steel brakes would require over 110 pounds of steel. For the same aircraft, this amount of heat can be dissipated by less than 7.5 pounds of ammonia.

The permeable material may be any material which is not chemically attacked by the ammonia or other coolant. However, excellent results may be obtained with nickel shot, for example, 60-mesh, which has been thermally bonded together or other sintered metal or metal containing compositions as these have relatively good heat conductivity. The nickel also catalyzes the dissociation of ammonia when ammonia is used as the coolant and therefore assists in heat absorption due to such dissociation. Other permeable materials which may be used are permeable ceramics, silicon carbide, aluminum oxide or other abrasives in the form of blocks of the bonded material having porosity. It is also possible to use refrigerant through-drilled coolant channels; however, if these are applied in conventional organic linings, high lining temperatures will still prevail because of the low thermal diffusivity of such materials and the larger separation of coolant channels.

It may be said that as a general rule the permeable material is comprised of about 75% to 95% solid and about 25% to 5% openings. The effective diameter of the openings or passages is usually not greater than about .04 inch, and the effective separation of the coolant channels is usually not greater than about .2 inch.

Figure 2:
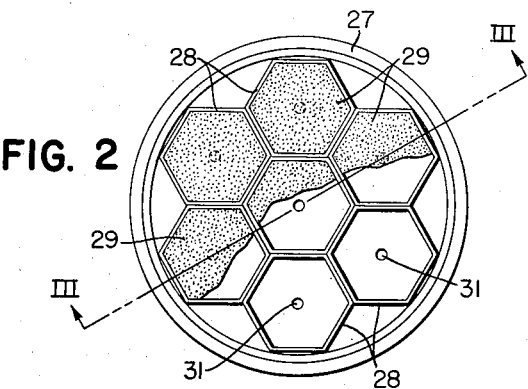
Fig. 2 is a front elevation of another embodiment of the principles of the invention incorporated into a round block of friction material.
Figure 3:
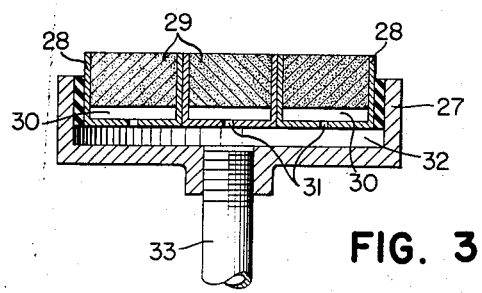
Fig. 3 is a cross sectional view taken on line III—III of Fig. 2.

Attention is directed to Figs. 2 and 3 of the drawings wherein the brake block or shoe forming the permeable body is particularly adapted to use with gaseous coolants. In this form of the invention, a cup-shaped member 27 receives a plurality of smaller cup-shaped members 28, for example of hexagonal shape (see Fig. 2) so that the cups 28 interfit to substantially completely fill the member 27. The cups 28 may also be made in the form of equilateral triangles. Preferably, a considerable number of cups 28 are employed (more than the number shown for purposes of simplification) as, far example, enough to make the spacing between orifices 31 ¼″ or even less. Each cup 28 contains a body of permeable material 29 made in the manner heretofore described. Note that a space 30 is provided in the bottom of each cup 28 serving as a manifold to uniformly distribute the cooling gas into the permeable body 29, and the bottom of each cup 28 is provided with an orifice 31 usually about ¹⁄₁₆″ or less in diameter. This orifice should operate at a large pressure differential compared to the pressure drop in the permeable body. In this way, the flow through each cup may be made substantially independent of the pressure drop in the permeable body. This is desirable to insure stable operation of the permeable body in the desired temperature range. For gaseous coolants, the orifice may be operated above the critical pressure ratio. Then, the volumetric flow rate will be independent of the pressure drop in the permeable body. In this case, the gaseous coolant is supplied to manifold 32 by way of conduit 33.

An advantageous feature of the use of ammonia as a coolant is that the hydrogen and nitrogen gases resulting from the dissociation combine with the air to produce "forming gas" which has been found to greatly enhance friction. In the presence of such gases at the interface the friction between surfaces has been found to be materially increased.

While a disc type brake has been illustrated in order to explain the invention, the invention is not limited to such type of apparatus but may be used in other types of brakes and clutches. The coolant may be stored in containers in liquid or gaseous form and valved to the brake or clutch simultaneous with the application of the brake or clutch.

It has been found with the method and apparatus of the invention that it is possible to absorb as much as 85% of the theoretical maximum amount of heat in the coolant whereas in known brake structures only about 15% of the heat generated is absorbed in the coolant.

When using a liquid coolant boiling normally occurs ⅙″ to ⅛″ from the discharge ends of the passages through the permeable body. This establishes that heat transfer by conduction occurs through the brake lining from the outer surface. Thus, convective transfer in boiling is actually cooling the lining interface.

While a certain representative embodiment and details have been shown for the purpose of illustrating the invention, it will be apparent to those skilled in this art that various changes and modifications may be made therein without departing from the spirit or scope of the invention.

What is claimed is:

1. Apparatus for rapidly absorbing heat in changing the relative velocity of two relatively movable members, a permeable body of bonded nickel shot having a maze of tortuous small passages therethrough and mounted on one of said members for movement into frictional engagement with a surface of the other member, and means for feeding a coolant through said permeable body to the interface of said body and said other member.

2. Apparatus for rapidly absorbing heat in changing the relative velocity of two relatively movable members, and comprising one member formed as a large cup, a plurality of polygonal-shaped smaller cups received in the large cut but spaced from the bottom of the large cup to form a manifold opening, a conduit for supplying fluid coolant to the manifold opening, each small cup having an orifice in its bottom, and a permeable body of bonded shot-like particles in each small cup, the permeable bodies together forming a friction surface.

3. Apparatus such as a brake for rapidly absorbing heat in changing the relative velocity of two relatively movable members, said apparatus comprising a permeable body of bonded particles of material mounted on one of said members for movement into frictional engagement with a surface of the other member, said permeable body being about 75% to 95% solid and about 25% to 5% openings, and the particles being in the order of 60 mesh size and the average effective openings on the order of not greater than about .04 inch in size, and means for positively feeding a liquid coolant under pressure through said permeable body to the interface of said body and the said other member.

References Cited in the file of this patent

UNITED STATES PATENTS

| | | |
|---|---|---|
| 480,982 | Wohlfarth | Aug. 16, 1892 |
| 535,738 | Smith | Mar. 12, 1895 |
| 1,912,101 | Short | May 30, 1933 |
| 1,930,277 | Lenz et al. | Oct. 10, 1933 |
| 2,442,202 | Caley | May 25, 1948 |

FOREIGN PATENTS

| | | |
|---|---|---|
| 701,725 | Great Britain | Dec. 30, 1953 |